United States Patent [19]

Marney, Jr. et al.

[11] Patent Number: 4,528,439
[45] Date of Patent: Jul. 9, 1985

[54] PORTABLE THERMALLY INSULATED CASE

[75] Inventors: O. Guy Marney, Jr.; Henry J. McKinley, Jr., both of Tulsa, Okla.

[73] Assignee: Standard Oil Company, Chicago, Ill.

[21] Appl. No.: 437,770

[22] Filed: Oct. 29, 1982

[51] Int. Cl.$^3$ ............................ C09K 5/06; H05B 1/00
[52] U.S. Cl. .................................... 219/386; 219/385; 219/378; 219/209; 219/399; 165/DIG. 4; 252/72
[58] Field of Search .............. 219/385, 386, 387, 399, 219/378, 210, 209; 126/400, 275 E, 275 R, 273.5; 165/47 A, 46, DIG. 4; 252/70, 71, 72, 71.1

[56] References Cited

U.S. PATENT DOCUMENTS

| | | | |
|---|---|---|---|
| 2,543,524 | 2/1951 | Oliveira | 219/387 |
| 2,803,115 | 8/1957 | Shepherd | 252/70 |
| 3,110,633 | 11/1963 | Bachmann | 219/209 |
| 3,273,634 | 9/1966 | Snelling | 219/378 |
| 3,764,780 | 10/1973 | Ellis | 165/47 A |
| 3,802,220 | 4/1974 | Pompo | 165/46 |
| 3,876,859 | 4/1975 | Franz | 219/385 |
| 4,009,368 | 2/1977 | Faivre | 219/387 |
| 4,198,559 | 4/1980 | Walter | 219/387 |
| 4,332,690 | 6/1982 | Kimura | 165/DIG. 4 |

FOREIGN PATENT DOCUMENTS

| | | | |
|---|---|---|---|
| 599047 | 5/1960 | Canada | 219/210 |

OTHER PUBLICATIONS

Guittar, N. L., "Temperature Stabilization Using Thermal Buffer", IBM Tech. Disc. Bull., vol. 20, No. 10, Mar. 1978, p. 4030.

*Primary Examiner*—Roy N. Envall, Jr.
*Assistant Examiner*—Teresa J. Walberg
*Attorney, Agent, or Firm*—Timothy D. Stanley

[57] ABSTRACT

A portable thermally insulated case has an outer shell formed of a bottom wall and upwardly extending side walls integral with each other with integral rigid polyurethane foam adhering to the inner surface of each of the walls. A cover, which has rigid polyurethane foam on its inner surface, is hinged to the rear upwardly extending wall to close an access opening at the top of the outer shell. Each of the bottom and upwardly extending walls of the outer shell has a separate container in contact with the inner surface of the polyurethane foam and defining a recess therebetween. The cover has a container supported within the rigid polyurethane foam and substantially closing an access opening at the upper ends of the separate containers adjacent the upwardly extending walls so that the containers substantially surround any object within the recess. Each of the containers has a phase change material therein to supply heat to any object within the recess. Each of the containers of the outer shell has an electrical heating element in contact with its inner surface and connected by wires exteriorly of the case to enable heat to be supplied from an external power source to the phase change material to change it to its original state when the case is disposed at a location having an external power source.

15 Claims, 20 Drawing Figures

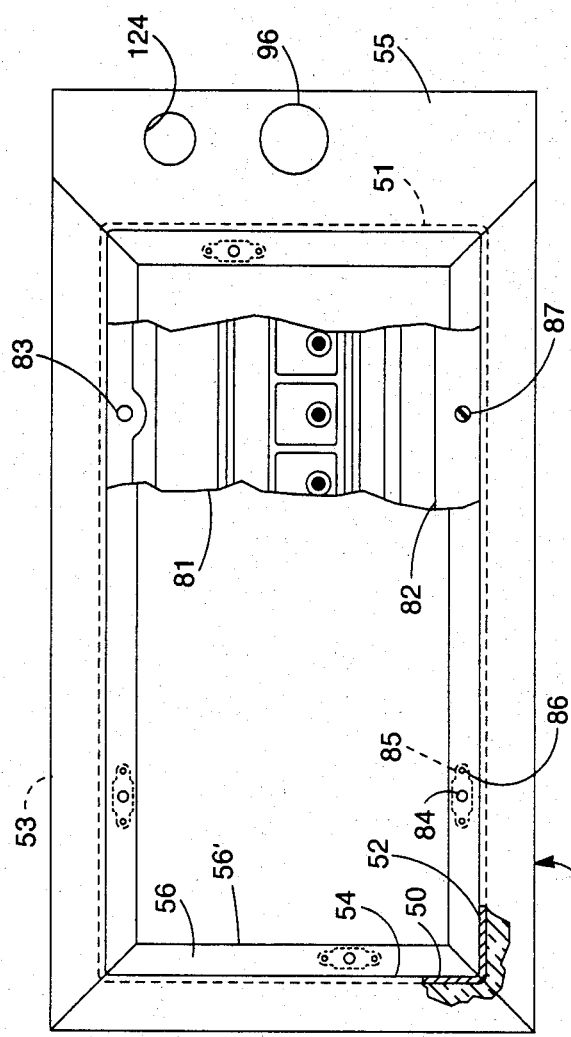
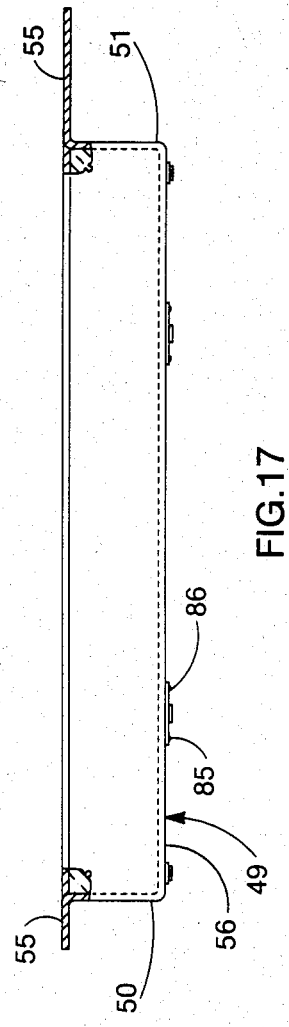
FIG. 16
FIG. 17

PORTABLE THERMALLY INSULATED CASE

TECHNICAL FIELD

This invention relates to a portable thermally insulated case and, more particlarly, to a portable thermally insulated case in which an object may be maintained at a selected temperature for a selected period of time in an ambient having a minimum or maximum temperature.

BACKGROUND ART

It has previously been suggested to use a phase change material in a container within a thermally insulated case with the phase change material having heat exchange with an object within the container to maintain the object either warmer or colder than the ambient. Examples of containers using phase change material are disclosed in U.S. Pat. Nos. 3,255,607 to Bair et al and 4,019,340 to Conklin. Another example of a thermal energy storage device in which a material absorbs or releases heat to a given region as the material changes state is disclosed in U.S. Pat. No. 3,976,584 to Leifer.

The aforesaid Conklin patent has a phase change material supported within a cover of a thermally insulated case and exposed to objects within the case. The aforesaid Bair et al patent has a phase change material supported in a hollow space within a shelf dividing the container into two parts with objects above and below the shelf. The aforesaid Leifer patent contemplates using a thermal energy storage material in a thermally conductive sealed container and disposing the sealed container in heat transfer relation with the air or the region that is being thermally conditioned.

In each of the portable cases in the aforesaid Conklin and Bair et al patents, the heat transfer through the thermally insulated walls of the case can be substantially greater than the heat transfer between the phase change material and an object within the case to be protected if there is a significant temperature differential between the temperature of the phase change material and the ambient. Accordingly, the temperature of an object within the case can decrease substantially below the temperature of the phase change material in a relatively short period of time when the temperature of the ambient is substantially colder than the temperature of the phase change material or can increase above the temperature of the phase change material in a relatively short period of time when the temperature of the ambient is substantially higher than the temperature of the phase change material.

The reason for the heat transfer through the thermally insulated walls being greater than the heat transfer from the phase change material to an object to be protected is because heat transfer occurs faster where there is the greatest temperature differential. Thus, if the temperature differential existing between the ambient and the object to be protected is relatively large in comparison with the temperature differential between the phase change material and the object to be protected, there is a substantial heat transfer between the object to be protected and the ambient so that the temperature of the object to be protected approaches the ambient temperature rather than the temperature of the phase change material.

The aforesaid Leifer patent primarily discusses using a thermal energy storage material where there is either heating or cooling also being supplied at the same time. However, the aforesaid Leifer patent discusses that the thermal energy storage material could be disposed to insulate a storage or transportation compartment containing goods but does not state how it is disposed.

DISCLOSURE OF THE INVENTION

The portable thermally insulated case of the present invention overcomes the problems of the aforesaid Conklin and Bair et al patents by substantially surrounding any object to be thermally protected with a phase change material. Thus, a substantially larger heat transfer from an object to be protected through the thermally insulated walls to the ambient rather than from the phase change material to an object to be protected cannot occur because of the phase change material substantially surrounding the object to be protected.

If the phase change material had perfect thermal conductivity and completely enclosed the object to be protected, the temperature of the object would not decrease below the temperature of the phase change material at which the phase change material would freeze if the phase change material was a liquid and it was desired to transfer heat to the object from the phase change material. However, the thermal conductivity of a liquid is not infinite so that the phase change material freezes non-uniformly and the frozen portion of the phase change material allows heat transfer therethrough.

Furthermore, containers of the phase change material around the object to be protected are not uniform so that they do not completely enclose the object to be protected. Thus, heat transfer occurs with the ambient from the object to be protected through any gap between the containers of the phase change material.

Accordingly, when the object to be protected is to be maintained above a selected minimum temperature and the phase change material is a liquid to be frozen, the temperature of the object to be protected will be slightly lower than the temperature at which the phase change material changes state from a liquid to a solid. The present invention decreases this heat transfer to an acceptable rate for an acceptable time period through surrounding the phase change material with a layer of closed cell thermally insulating or low thermal conductivity material through which air cannot flow.

The thermally insulated case of the present invention has particular utility in protecting a sensitive object from having its temperature decrease to any extent below the freezing temperature of water while being used in relatively low ambient temperatures. A specific utilization of the thermally insulated case of the present invention is to thermally protect a recorder of a cableless seismic digital recording system of the type disclosed in U.S. Pat. No. 3,806,804 to Broding et al and requiring a battery for operating it.

Since exploration for oil and gas can occur in a relatively low temperature ambient, it is necessary for the instrument to function in ambient temperatures as low as $-40°$ F., for example, for relatively long periods of time such as eight to ten hours, for example. The thermally insulated case of the present invention is capable of accomplishing this protection since tests have been conducted in which the temperature of the instrument within the thermally insulated case of the present invention has been maintained at a minimum of 22° F. for at least ten hours when the ambient temperature is at $-40°$ F. and the instrument has been preheated to at least 70° F.

To enable use of the portable thermally insulated case each day, the case of the present invention also has means for increasing the temperature of the phase change material beyond that in which it changes state from a solid to a liquid. The thermally insulated case of the present invention has electrical heating elements attached to each of its outer shell containers having the phase change material therein. These heating elements are connected by electrical wires extending through the thermal insulation material to electrical contacts on the exterior of the case for connection to an external source of electrical power. Accordingly, the phase change material can be heated above the temperature at which it changes to a liquid to increase the time period before the object to be protected falls below the temperature at which the phase change material freezes. This also preheats the recorder within the case to substantially the same temperature.

An object of this invention is to provide a unique portable thermally insulated case.

Another object of this invention is to provide a portable thermally insulated case having a phase change material substantially surrounding an object to be protected.

A further object of this invention is to provide a portable thermally insulated case in which an object within the case is maintained at a selected temperature for a minimum selected period of time when subjected to an ambient temperature having a substantial temperature differential with the selected temperature at which the object is to be maintained.

Other objects of this invention will be readily perceived from the following description, claims, and drawings.

This invention relates to a thermally insulated case including an outer shell having a low thermal conductivity material on its inner surface. The outer shell has first container means disposed adjacent the low thermal conductivity material on the inner surface thereof with the first container means defining an interior recess bounded by the first container means excepting a first access opening to the recess. The outer shell has a second access opening communicating with the first access opening with the second access opening being closed by closing means. The first container means has a phase change material therein for heat exchange with any object within the recess.

This invention also relates to a thermally insulated case for maintaining any object inside the case above +22° F. for at least ten hours when exposed to ambient temperatures at as low as −40° F. including a thermally insulated outer shell having a plurality of thermally insulated integral walls with each of the integral walls having first container means positioned interior thereof and in contact with its inner surface. The first container means defines a recess therebetween and has a first access opening to the recess. The first container means has a phase change material therein for heat exchange with any object within the recess. The outer shell has a second access opening communicating with the first access opening with the second access opening being closed by thermally insulated closing means. The closing means has second container means therein and adjacent the recess when the closing means closes the second access opening with the second container means having a phase change material therein for heat exchange with any object within the recess. The second container means substantially closes the first access opening when the closing means closes the second access opening. The first container means has electrical heating means in contact therewith to heat the phase change material when connected to an external electrical power source to return the phase change material to its state that existed prior to having heat exchange with any object within the recess. Means extends from the heating means to the exterior of the outer shell to connect the heating means to the external electrical power source.

This invention further relates to an apparatus for shielding electronic circuitry used during seismic prospecting from ambient temperatures outside the operating temperature specifications of the circuitry comprising a shell of material having a low thermal conductivity between the exterior surface of the shell exposed to the ambient temperatures and the interior surface of the shell with the interior surface of the shell defining a region for containing the circuitry. The region has an access thereto with a closure sealing the access to the region. The shell has a phase change material for maintaining the temperature of the region within the operating temperature of the circuitry with the phase change material being disposed in surrounding relation to at least the region other than the access to the region.

This invention still further relates to a phase change material for use in a thermally insulated case including a mixture of water, gelatin, sodium benzoate, and a biocide.

BRIEF DESCRIPTION OF THE DRAWINGS

The attached drawings illustrate a preferred embodiment of the invention, in which:

FIG. 16 is a top plan view, partly in section, of a frame assembly;

FIG. 17 is a front elevational view, partly in section, of the frame assembly of FIG. 16;

BEST MODE FOR CARRYING OUT THE INVENTION

Figure 1:
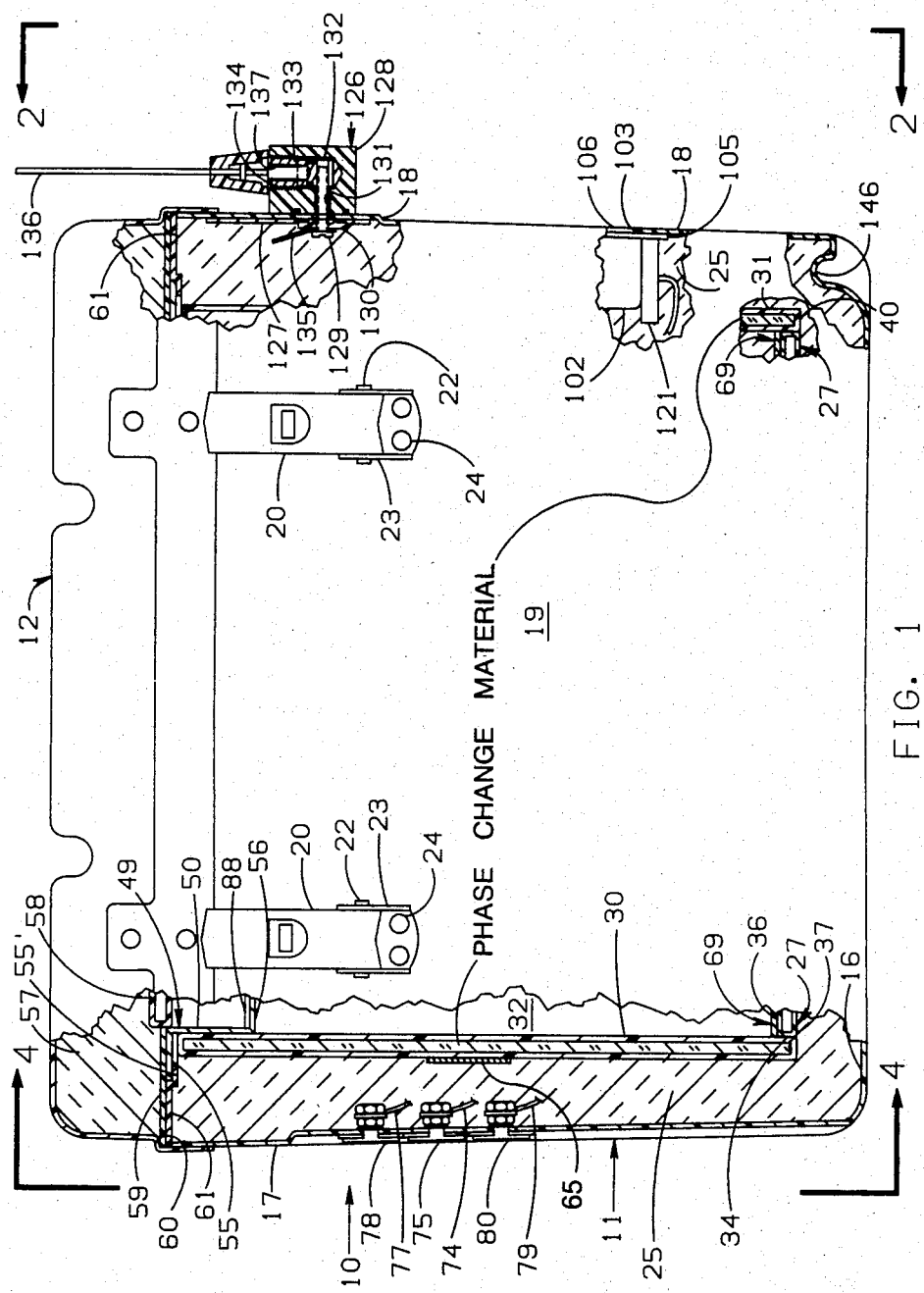
FIG. 1 is a front elevational view, partly in section, of a portable thermally insulated case of the present invention.
Figure 2:
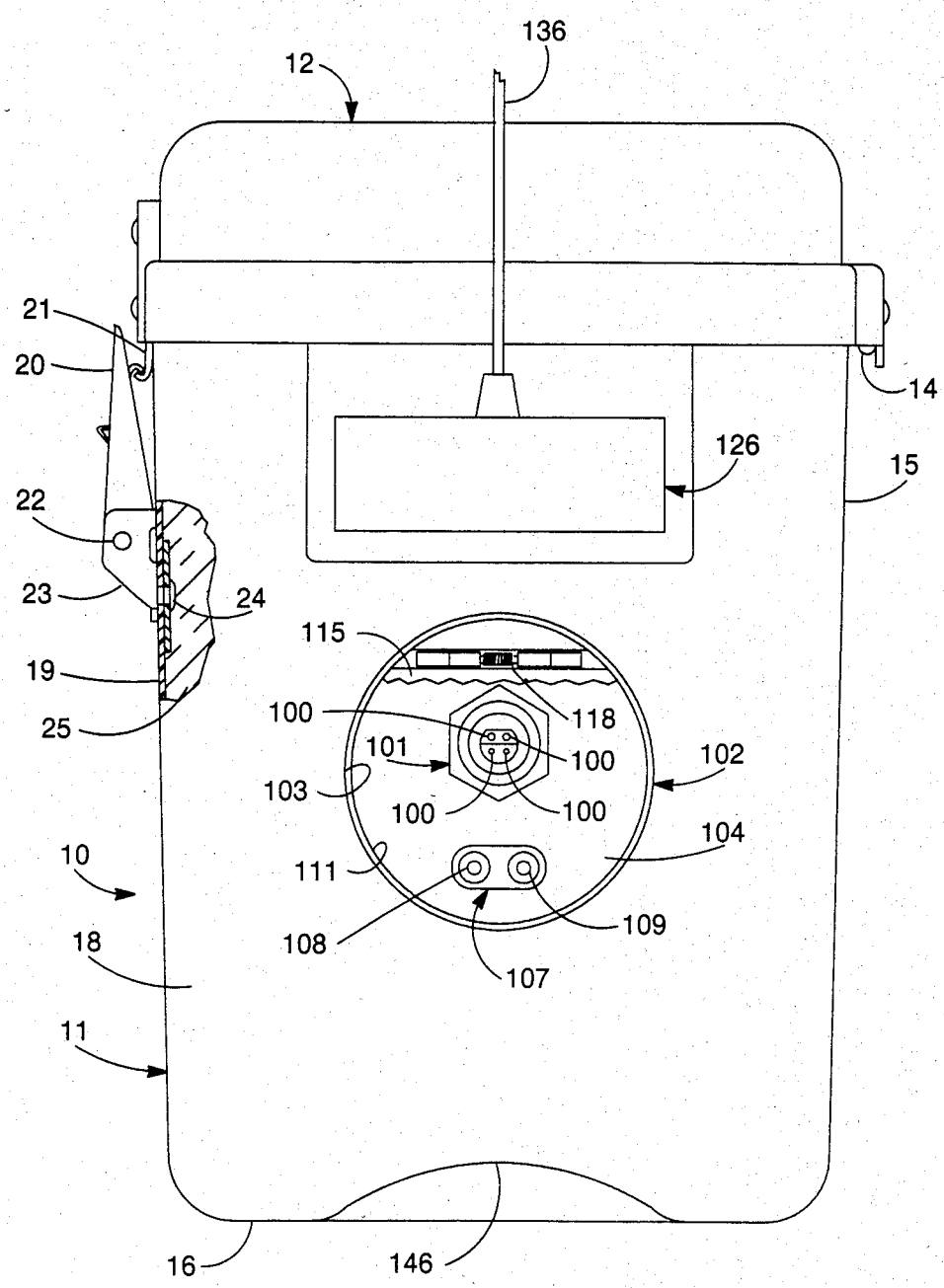
FIG. 2 is a side elevational view, partly in section, of the case of FIG. 1 and taken substantially along line 2—2 of FIG. 1.

Referring to the drawings and particularly FIG. 1, there is shown a portable thermally insulated case 10 having an outer or bottom shell 11 and a cover or top shell 12 pivotally connected to the outer or bottom shell 11 by a hinge 14 (see FIG. 2). The hinge 14 extends between a back or rear wall 15 of the outer or bottom shell 11 and an inner surface of the top or upper shell 12. The outer or bottom shell 11 has the back wall 15 integral with a bottom wall 16 (see FIG. 1), end walls 17 and 18, and a front wall 19.

When in its closed position, the top shell 12 is releasably secured to the outer or bottom shell 11 by a pair of latches 20 on the front wall 19 of the outer or bottom shell 11 cooperating with a pair of strike latches 21 (see FIG. 2) on the front of the top shell 12 and extending downwardly from the inner surface of the top shell 12. Each of the latches 20 is pivotally mounted on a pivot pin 22 supported in a U-shaped channel 23, which is attached by rivets 24 to the front wall 19 of the outer or bottom shell 11.

Each of the outer or bottom shell 11 and the top shell 12 is formed of the same material and is formed of a material that will not break if the case 10 should be accidentally dropped. One suitable example of the material of the outer or bottom shell 11 and the top shell 12 of the case 10 is polycarbonate with the outer or bottom shell 11 and the top shell 12 being formed by injection molding.

The inner surfaces of the back wall 15, the bottom wall 16 (see FIG. 1), the end walls 17 and 18, and the front wall 19 have a thermally insulating or low thermal conductivity material 25 bonded thereto with the thermally insulating or low thermal conductivity material 25 being integral. The thermally insulating or low thermal conductivity material 25 is preferably rigid polyurethane foam, which is formed by blowing in so as to be bonded to the inner surface of each of the walls 15-19 of the outer or bottom shell 11.

The thermally insulating or low thermal conductivity material 25 may be formed of any suitable thermally insulating or low thermal conductivity material having a closed cell construction so that air cannot flow therethrough. It also is necessary that the thermally insulating or low thermal conductivity material have sufficient strength to not break when the case 10 is accidentally dropped.

Figure 3:
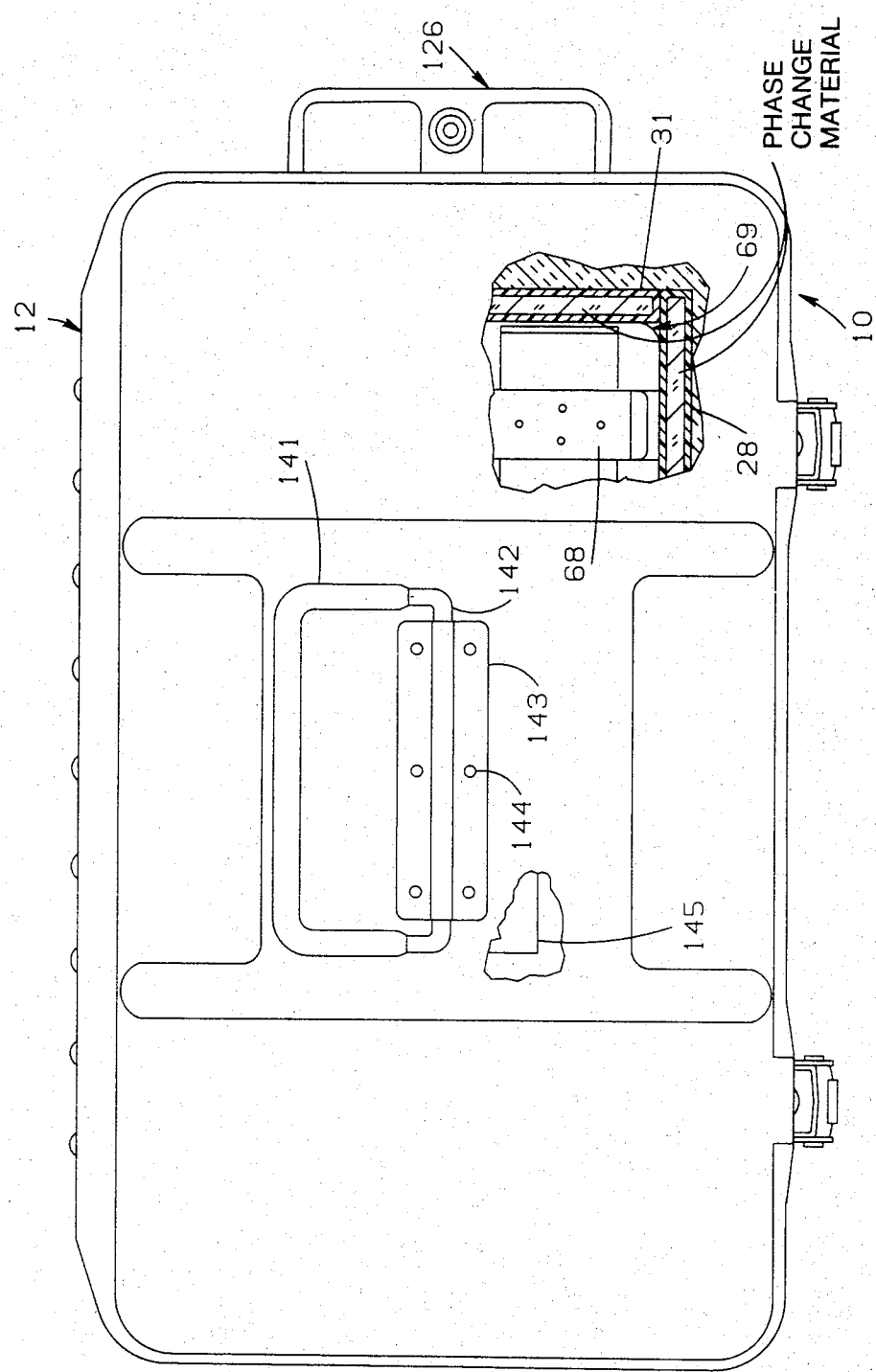
FIG. 3 is a top plan view, partly in section, of the case of FIG. 1.
Figure 4:
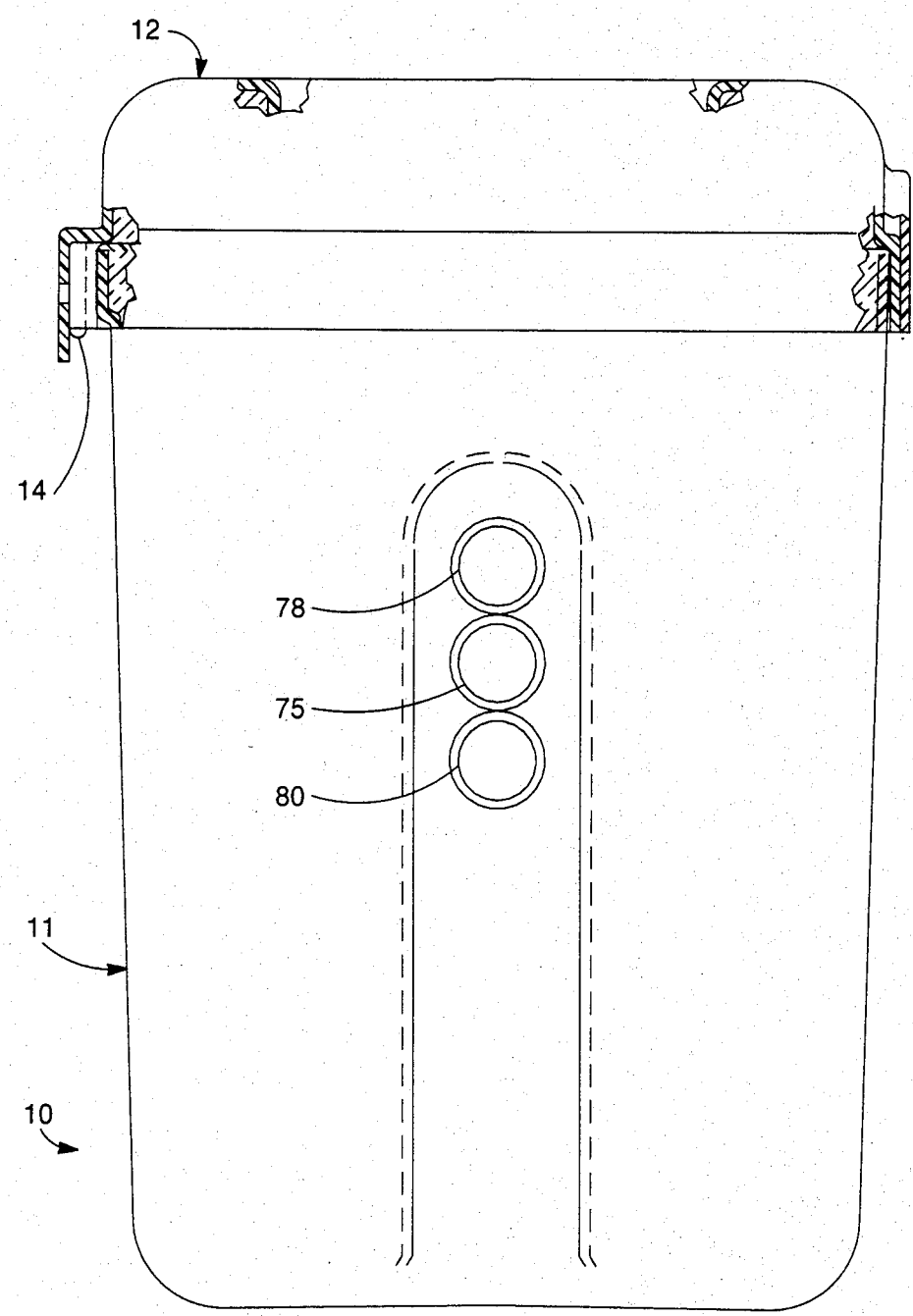
FIG. 4 is an end elevational view of the case of FIG. 1 and taken along line 4—4 of FIG. 1.
Figure 5:
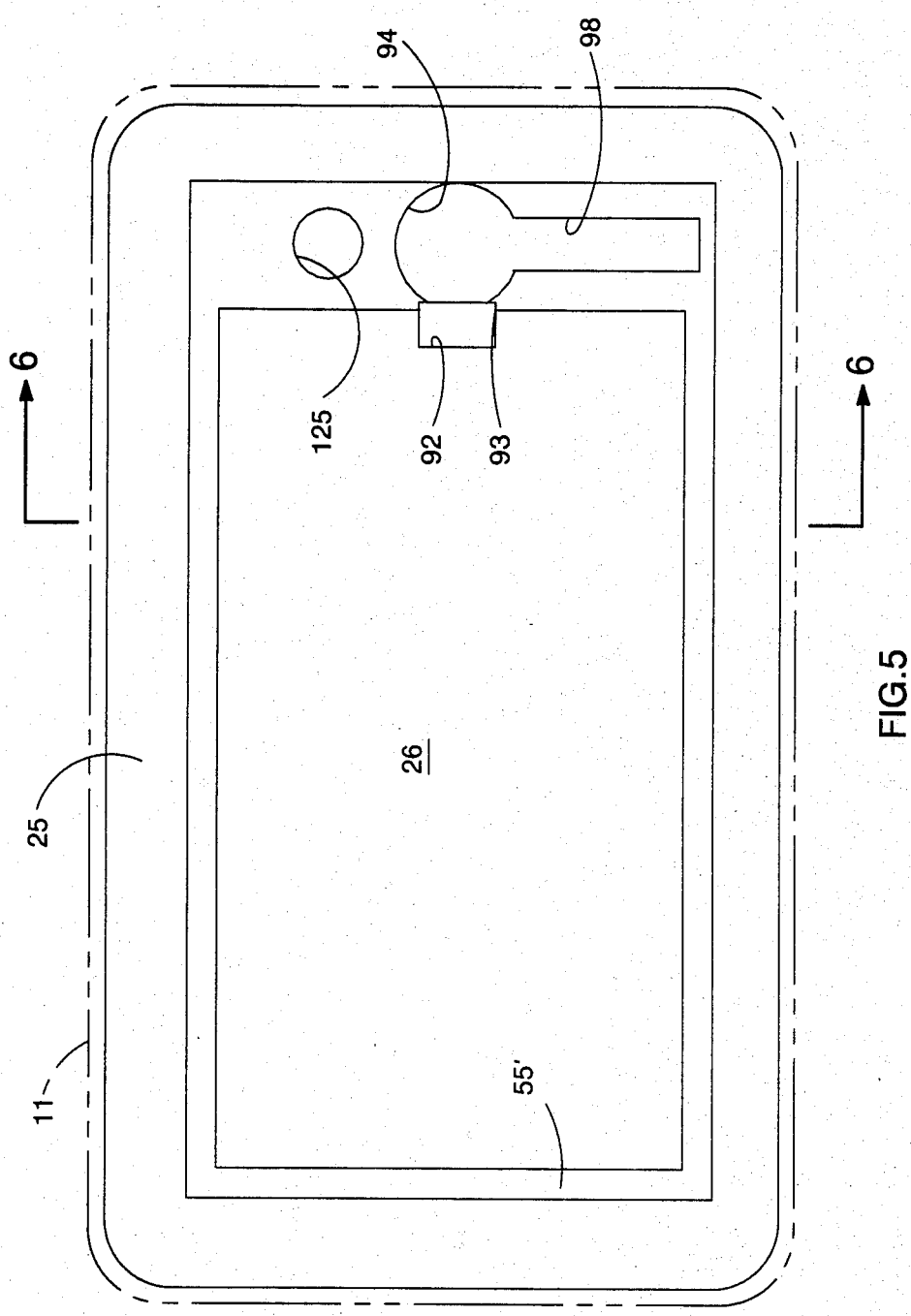
FIG. 5 is a top plan view of thermally insulating or low thermal conductivity material for disposition within an outer or bottom shell of the case of FIG. 1 and showing the outline of the outer shell in phantom.

The inner surfaces of the thermally insulating or low thermal conductivity material 25 define a recess or cavity 26 (see FIG. 5) within which a hollow bottom container or jacket 27 (see FIG. 1), a hollow front container or jacket 28 (see FIG. 3), a hollow rear container or jacket 29 (see FIG. 7), and hollow end containers or jackets 30 (see FIG. 1) and 31 are disposed. Each of the containers or jackets 27-31 has a phase change material therein to protect from the ambient any object disposed within a recess or region 32 defined by the interior of the containers 27-31. The upper ends of the containers 28-31 define an access opening to the recess 32.

The phase change material in each of the containers 27-31 is a material capable of having a relatively large heat transfer. When the object within the recess 32 is to be protected from an ambient of a relatively low temperature such as $-40°$ F., for example, the phase change material must be capable of having a relatively large heat transfer when changing from a liquid to a solid. Furthermore, to prevent leakage, if any of the containers 27-31 should rupture, the phase change material is preferably a gel so that there will not be leakage of liquid from any of the containers 27-31.

A suitable example of the phase change material within each of the containers 27-31 is a mixture of water, sodium benzoate, and a biocide. One suitable example of the gelatin is Knox brand gelatin. One suitable example of the biocide is undiluted Lysol brand disinfectant, which includes o-phenylphenol and o-benzyl-p-chlorophenol with there being 2.8% of o-phenylphenol and 2.7% of o-benzyl-p-chlorophenol. When using the Knox brand gelatin as the gelatin and the undiluted Lysol brand disinfectant as the biocide, fourteen grams of the Knox brand gelatin is mixed with one hundred milliliters of water and 0.1 gram of sodium benzoate. One hundred milliliters of this mixture has two milliliters of the undiluted Lysol brand disinfectant added to produce the phase change material as a gel.

It should be understood that any other suitable phase change material may be employed in each of the containers 27-31. It is not a requisite that each of the containers 27-31 have the same phase change material, but it is preferred.

Figure 12:
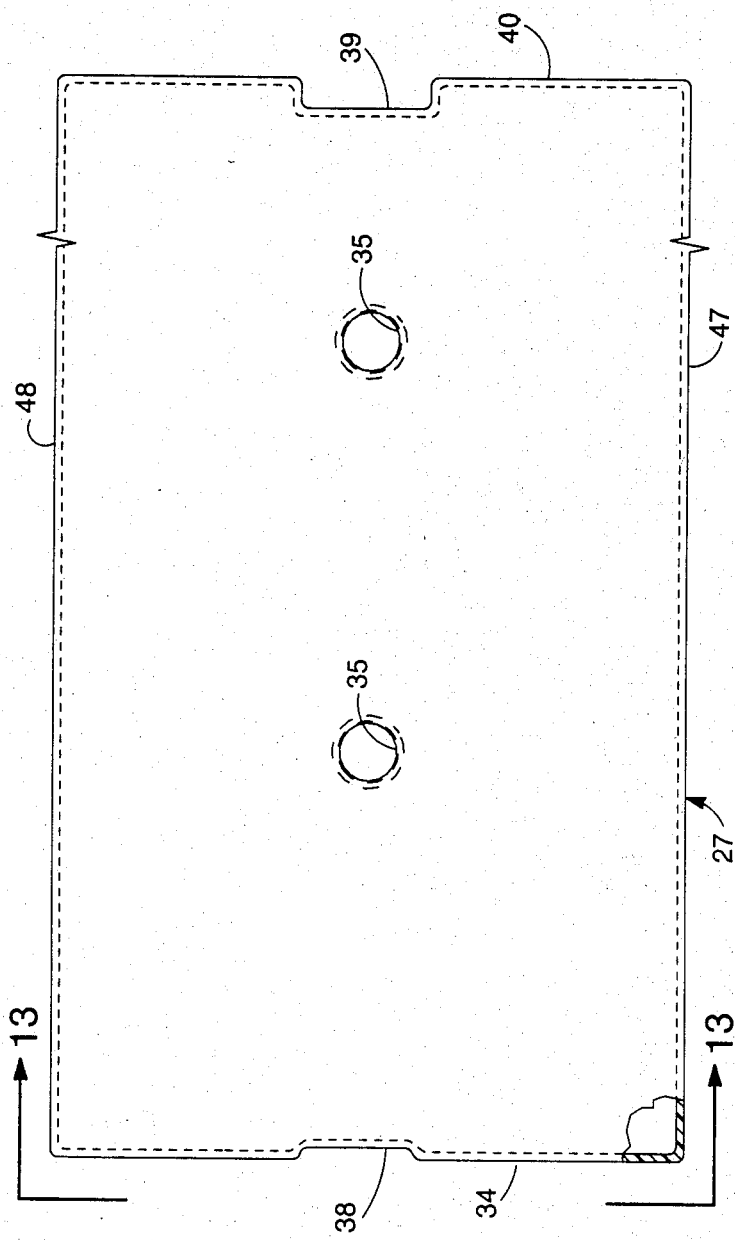
FIG. 12 is a top plan view, partly in section, of a bottom container for the phase change material.
Figure 13:
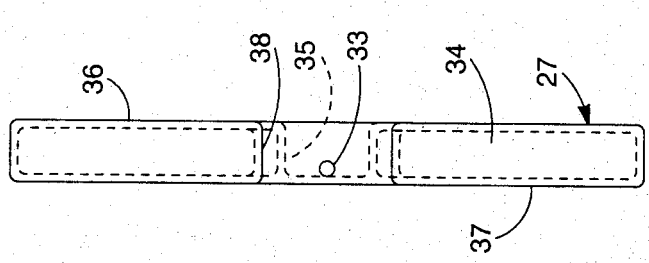
FIG. 13 is an end elevational view of the bottom container of FIG. 12 and taken substantially along line 13—13 of FIG. 12.

As shown in FIG. 13, the hollow bottom container 27 has an opening 33 in its end wall 34 through which the phase change material is inserted into the interior of the hollow bottom container 27. The bottom container 27 has a pair of indented recesses 35 (see FIG. 12) in its top wall 36 and integral with its bottom wall 37 (see FIG. 13) to add rigidity to the bottom container 27.

The bottom container 27 has a slot 38 (see FIG. 12) in the end wall 34 to prevent an adhesive such as ABS adhesive, for example, which seals the opening 33 (see FIG. 13) after the interior of the hollow bottom container 27 has been filled with the phase change material through the opening 33, from protruding beyond the periphery of the bottom container 27. The bottom container 27 also has a slot 39 (see FIG. 12) in its end wall 40.

Figure 14:
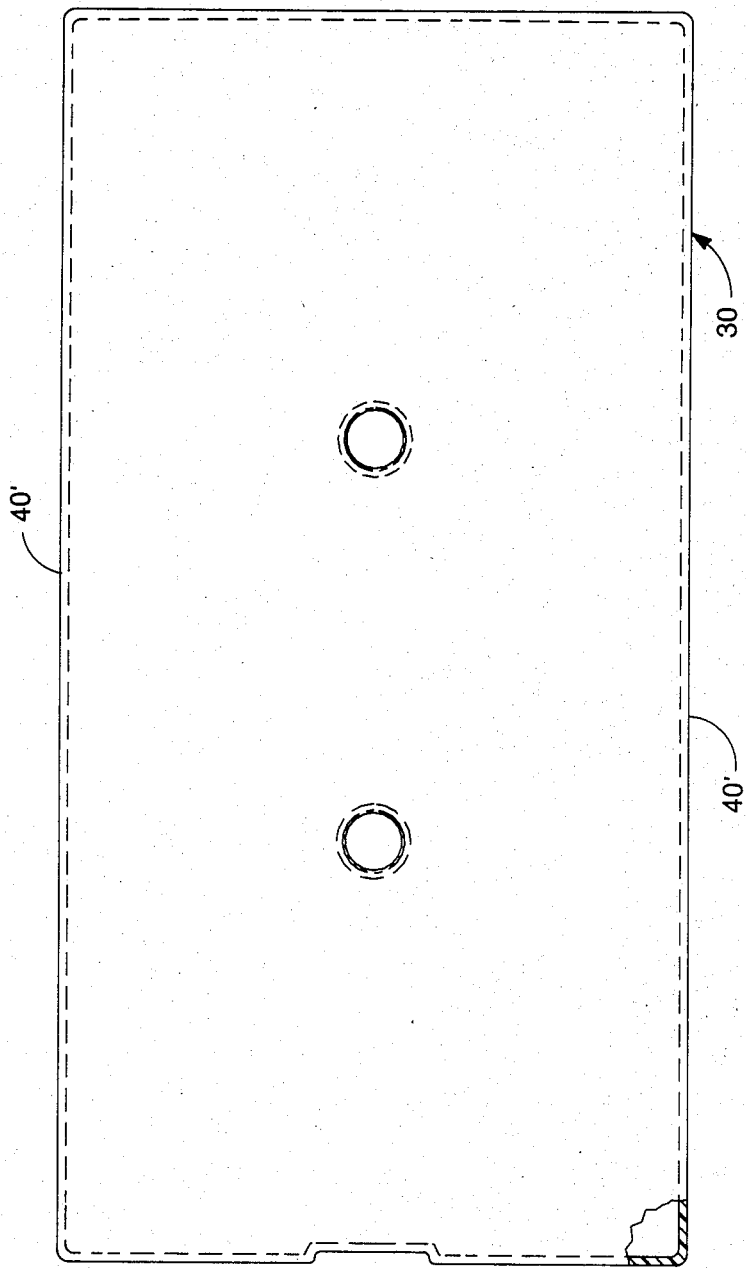
FIG. 14 is a top plan view of one of the end containers for the phase change material.

As shown in FIG. 14, the hollow end container 30 (The hollow end container 31 is the same as the hollow end container 30.) has substantially the same shape as the bottom container 27 (see FIG. 12) although the end container 30 (see FIG. 14) is longer and wider. Furthermore, the end container 30 does not have the slot 39 (see FIG. 12) as the bottom container 27 has. Additionally, the end container 30 (see FIG. 14) has its side walls 40' inclined inwardly from its upper end (This is the left end in FIG. 14.) to its lower end.

Figure 10:
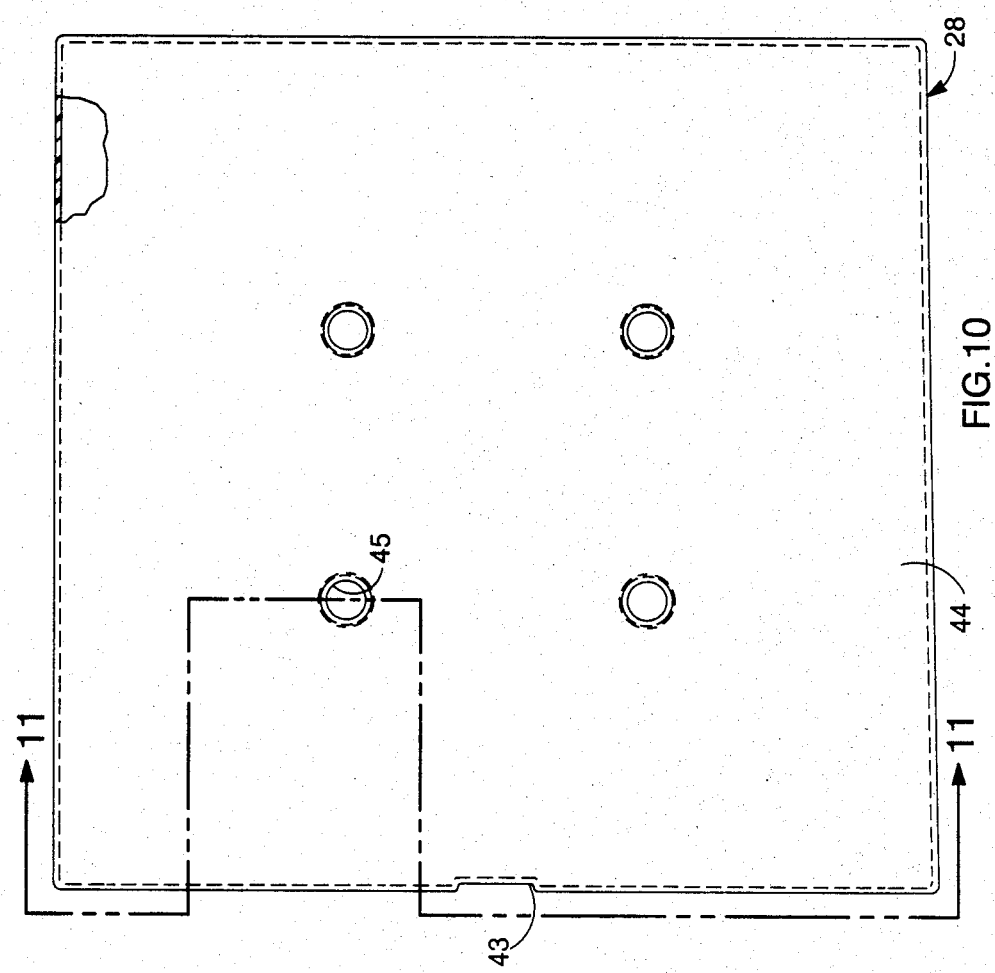
FIG. 10 is a top plan view of a front container for the phase change material.
Figure 11:
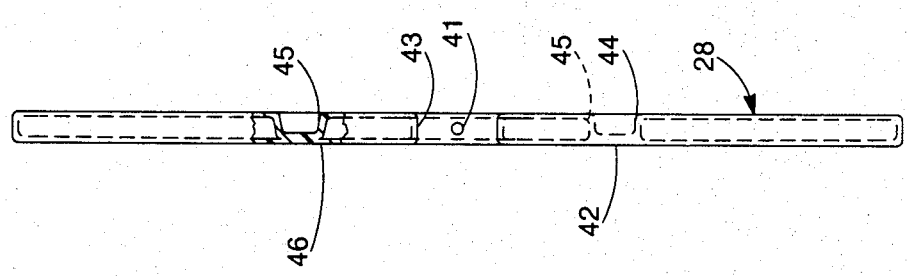
FIG. 11 is an end elevational view, partly in section, of the front container of FIG. 10 and taken substantially along line 11—11 of FIG. 10.

As shown in FIG. 11, the hollow front container 28 (The hollow rear container 29 is the same as the hollow front container 28.) has an opening 41 in its end wall 42 through which the phase change material is inserted into the interior of the hollow front container 28. The end wall 42 of the front container 28 has a slot 43 (see FIG. 10) in the location of the opening 41 (see FIG. 11) to enable the ABS adhesive to not protrude beyond the periphery of the front container 28. The front container 28 has its top wall 44 formed with four recesses 45 (see FIG. 10) extending to its bottom wall 46 (see FIG. 11) and integral therewith. The recesses 45 add rigidity and strength to the hollow front container 28.

As shown in FIG. 1, the bottom wall 37 of the bottom container 27 rests on the upper surface of the bottom portion of the thermally insulating or low thermal conductivity material 25. The length and width of the bottom container 27 are selected so that the end walls 34 and 40 of the bottom container 27 are spaced from the inner surface of the thermally insulating or low thermal conductivity material 25 in contact with the inner surface of each of the end walls 17 and 18 of the outer shell 11. The bottom container 27 also has its side walls 47 (see FIG. 12) and 48 spaced from the inner surface of the thermally insulating or low thermal conductivity material 25 (see FIG. 2) bonded to the front wall 19 and the back or rear wall 15 of the outer or bottom shell 11.

Accordingly, there is a space between the bottom container 27 (see FIG. 1) and the inner surface of the thermally insulating or low thermal conductivity material 25 on the inner surface of each of the upwardly extending walls 15 (see FIG. 2), 17 (see FIG. 1), 18, and 19. This space enables each of the containers 28 (see FIG. 7) and 29 to be disposed against the inner surface of the thermally insulating or low thermal conductivity material 25 and have a portion of one of its walls engaging the side walls 47 and 48, respectively, of the bottom container 27 and each of the containers 30 (see FIG. 1) and 31 to be disposed against the inner surface of the thermally insulating or low thermal conductivity material 25 and have a portion of one of its walls engaging the end walls 34 and 40, respectively, of the bottom container 27 so as to prevent heat leakage therebetween. The inclined side walls 40' (see FIG. 14) of each of the end containers 30 and 31 aid in disposing the containers 28–31 adjacent the bottom container 27.

Figure 7:
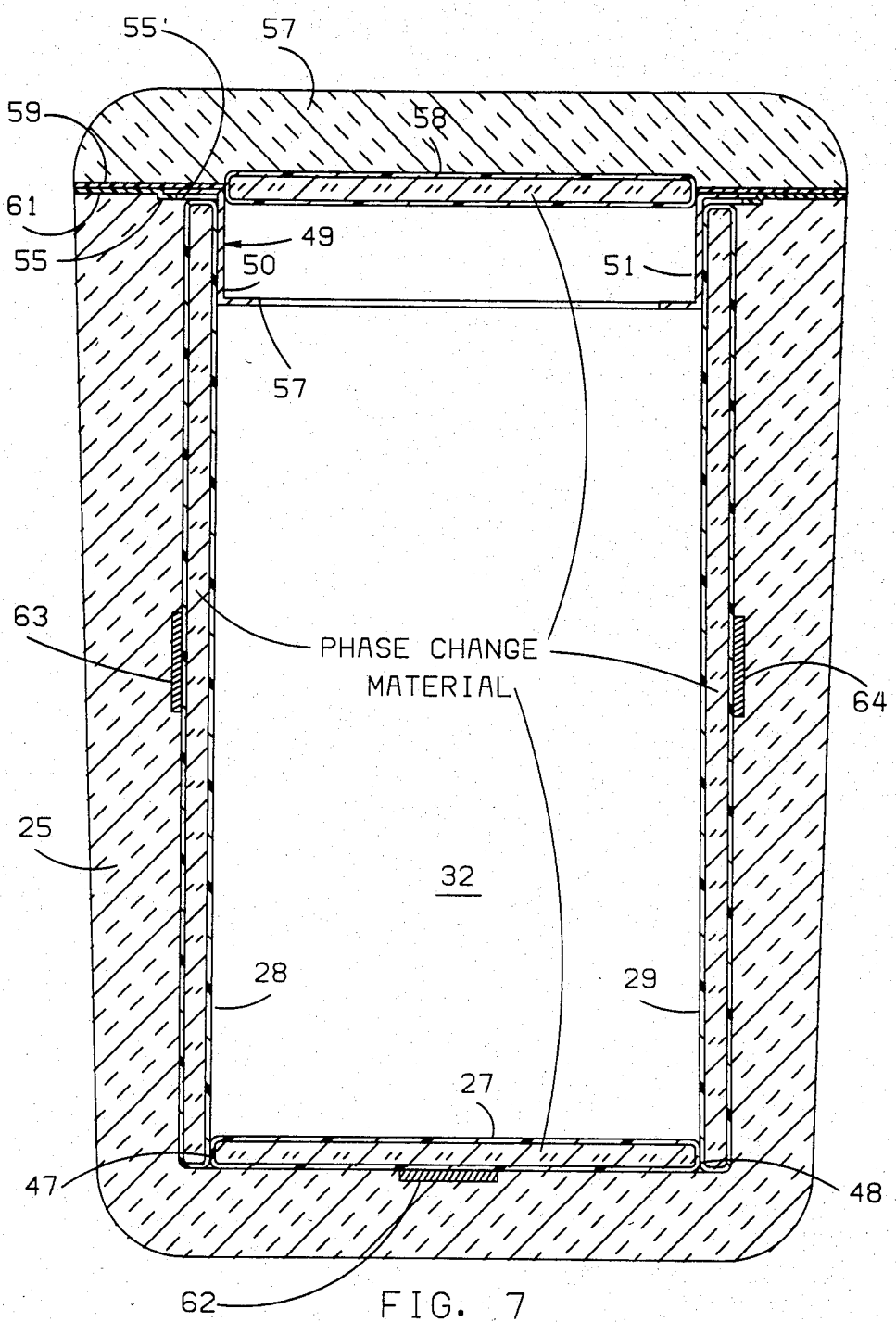
FIG. 7 is a schematic view showing the relation of the side containers for the phase change material in conjunction with the bottom and top containers of the phase change material.

As shown in FIGS. 1 and 7, a frame assembly 49 is employed to hold the upper ends of the containers 28–31 against the upper ends of the thermally insulating or low thermal conductivity material 25 to maintain an entire wall of each of the containers 28–31 in engagement with the inner surface of the adjacent thermally insulating or low thermal conductivity material 25. The frame assembly 49 (see FIGS. 16 and 17) includes vertical side walls 50 and 51, a vertical front wall 52, and a vertical rear wall 53 integral with each other and forming a rectangular shaped opening 54 therebetween. The vertical walls 50–53 have their outer surfaces bearing against the inner surface of the upper ends of the containers 28–31, respectively, as shown in FIGS. 1 and 7.

The frame assembly 49 (see FIG. 16) has a horizontally disposed flange 55 extending outwardly from the upper end of each of the walls 50–53. The portion of the flange 55 extending outwardly from the vertical side wall 51 is wider than the other three sides of the rectangular shaped flange 55. As shown in FIGS. 1 and 7, the bottom surface of the flange 55 extends over the upper end of each of the containers 28–31 and rests on top of a recessed surface 55' (see FIG. 5) in the thermally insulating or low thermal conductivity material 25 as shown in FIG. 1.

As shown in FIG. 16, the bottom end of each of the walls 50–53 has a portion of a rectangular shaped flange 56 integral therewith and extending inwardly therefrom. The inner surface of the flange 56 defines a rectangular shaped opening 56', which is smaller than the opening 54 and provides access to the interior of the recess 32 (see FIG. 1).

As shown in FIGS. 1 and 7, the tight fit of the vertical walls 50–53 of the frame assembly 49 within the containers 28–31 holds the frame assembly 49 therein. Of course, the frame assembly 49 can be readily removed therefrom when desired.

The top shell 12 (see FIG. 1) has thermally insulating or low thermal conductivity material 57, which is the same as the thermally insulating or low thermal conductivity material 25, therein and bonded to the inner surface of the top shell 12 by being blown in. A hollow top container or jacket 58 is disposed in contact with a central portion of the inner surface of the thermally insulating or low thermal conductivity material 57. The top container 58 is the same shape and size as the bottom container 27. The top container 58 is retained in the thermally insulating or low thermal conductivity material 57 by suitable means such as a double backed tape, for example. This permits replacement of the top container 58 if necessary.

A gasket 59 surrounds the periphery of the top container 58 and has its outer periphery contacting a peripheral flange 60 of the top shell 12. Thus, the gasket 59 rests against the portion of the inner surface of the thermally insulating or low thermal conductivity material 57 that does not have the top container 58 bearing thereagainst.

The top gasket 59, which is formed of a suitable material such as silicone, for example, is secured to the thermally insulating or low thermal conductivity material 57 in the top shell 12 by suitable means such as an adhesive, for example. One suitable example of the adhesive is DATCO 3300.

Thus, when the top shell 12 has closed the access opening to the outer shell 11 and communication with the access opening defined by the upper ends of the containers 28–31, the top container 58 contacts the frame assembly 49 and is spaced only a slight amount from the upper end of each of the containers 28–31 as shown in FIGS. 1 and 7. Accordingly, any object disposed within the recess 32 within the containers 27–31 is substantially surrounded by the containers 27–31 and the container 58 with each having the phase change material therein. Therefore, there is no relatively large temperature differential available between any object within the recess 32 and the ambient in which the case 10 is disposed. The slight spacing between the top container 58 and the upper ends of the containers 28–31 has the relatively large thermally insulating or low thermal conductivity material 57 adjacent thereto.

Furthermore, the gasket 59 (see FIG. 1) bears against a gasket 61, which is formed of silicone and is secured to the thermally insulating or low thermal conductivity material 25 at its upper end by the same adhesive as used to secure the gasket 59 to the thermally insulating or low thermal conductivity material 57. The inner end of the gasket 61 is disposed beneath the outer end of the flange 55 of the frame assembly 49.

When the phase change material in the containers 27–31 and 58 is used to supply heat to any object within the recess 32 to protect the object from a low ambient temperature in which the case 10 is located, each of the containers 27–31 has means to heat the phase change material within each of the containers 27–31 when the case 10 is returned to an area having an external power source. The heating means also may be utilized to heat the phase change material beyond that at which it changes state from a solid and to a liquid, which is actually a gel when using the preferred phase change material, so that additional heat will be stored in the phase change material for use when the case 10 is again employed in a relatively low ambient temperature to protect any object within the recess 32. The heating means also heats any object in the recess 32 and the phase change material in the recess 26 (see FIG. 5).

The heating means includes an electrical heating element 62 (see FIG. 15) for the bottom container 27, an electrical heating element 63 on the front container 28, an electrical heating element 64 on the rear container 29, an electrical heating element 65 on the end container 30, and an electrical heating element 66 on the end container 31.

Each of the heating elements 62, 65, and 66 is a solid rectangular shaped electrical element. Each of the heating elements 63 and 64 is a rectangular shaped electrical element having a hollow center. Each of the electrical heating elements 63–66 is centered on the containers 28–31, respectively, to equally distribute the heat throughout the containers 28–31.

Figure 18:
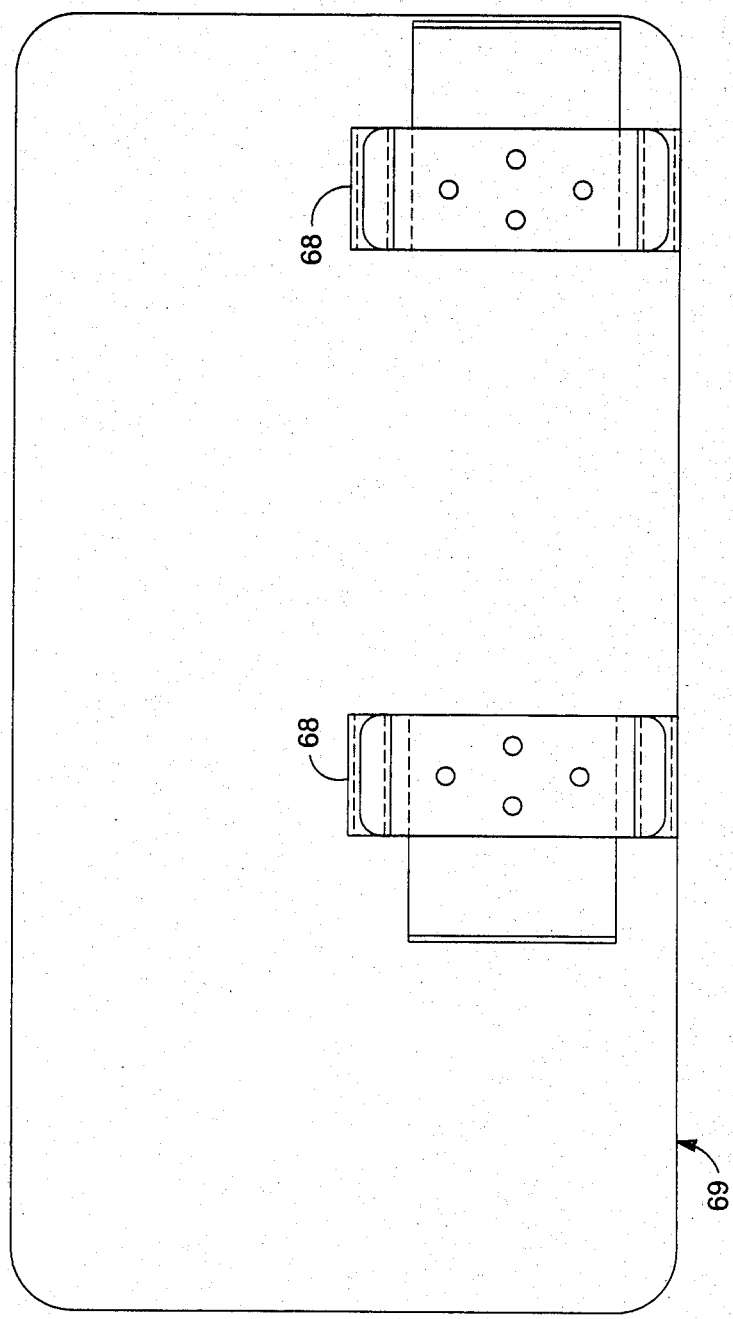
FIG. 18 is an end elevational view of a battery mount assembly.
Figure 19:
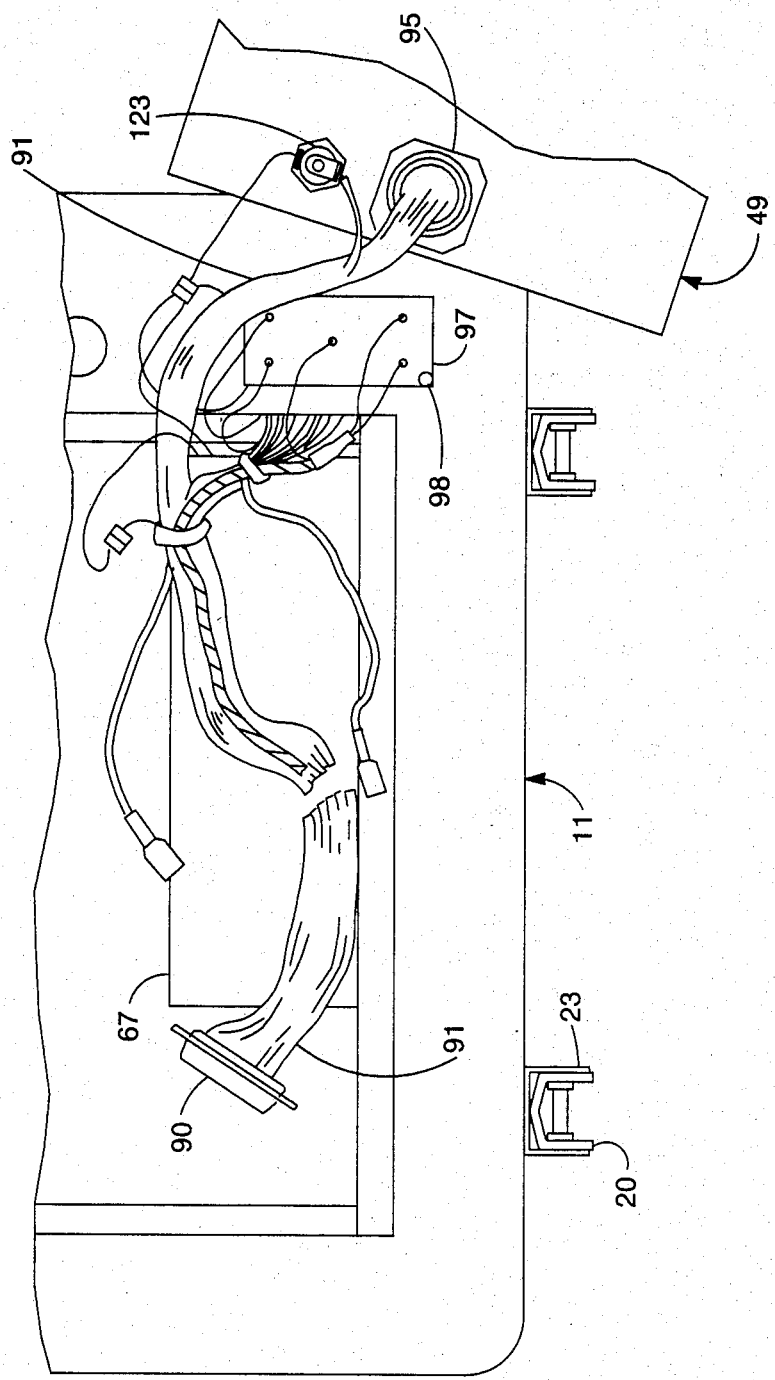
FIG. 19 is a fragmentary top plan view of a portion of the case with the frame assembly removed.

Because of the bottom container 27 supporting a battery 67 (see FIG. 19) in clips 68 (see FIG. 18) on a battery mount assembly 69, which is releasably secured to the top wall 36 (see FIG. 1) of the bottom container 27 by suitable means such as double backed tape, for example, the heating element 62 (see FIG. 15) cannot be centered relative to the bottom container 27 due to the position of the battery clips 68 (see FIG. 18). Furthermore, the heating element 62 (see FIG. 15) is mounted on the upper surface of the battery mount assembly 69 (see FIG. 18).

Figure 15:
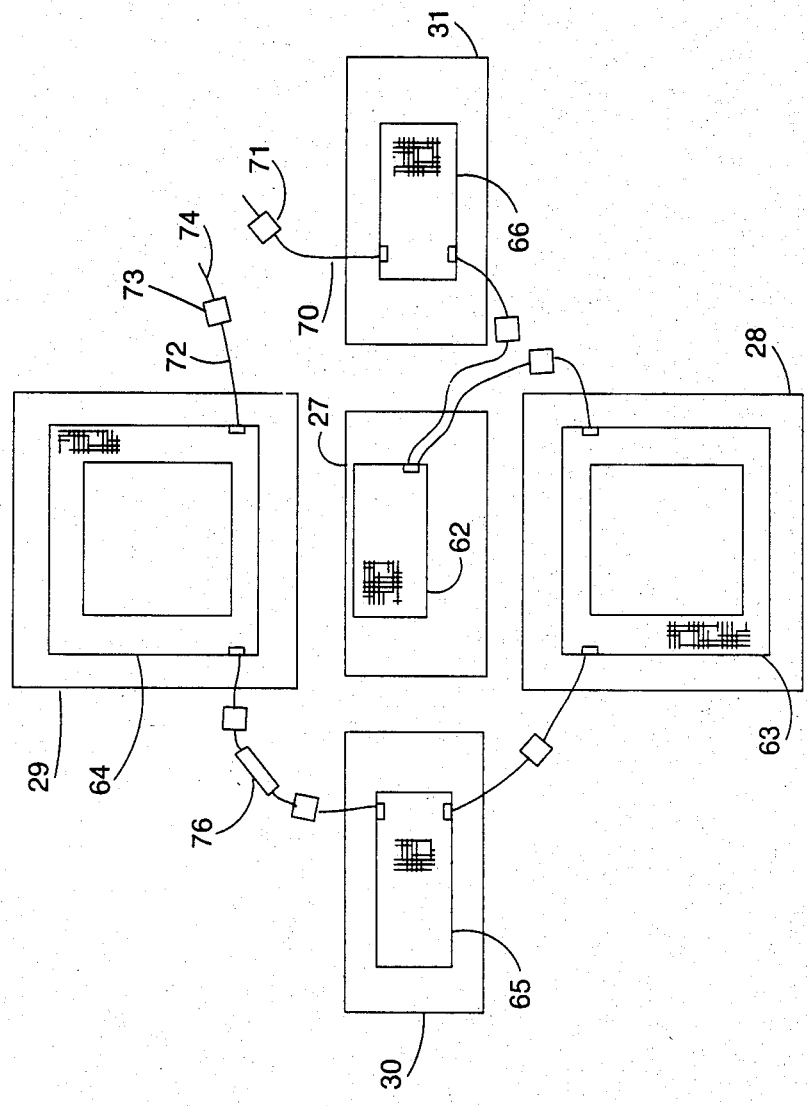
FIG. 15 is an exploded schematic view showing heating elements on the bottom, front, rear, and end containers for the phase change material.

As shown in FIG. 15, the electrical heating elements 62–66 are connected in series with a wire 70 connecting the electrical heating element 66 to a ground terminal 71. A wire 72 extends from the heating element 64 to a terminal 73, which is connected by a wire 74 to a contact button 75 (see FIG. 1) on the exterior of the end wall 17 of the outer shell 11 for connection to an external power source to provide current to the electrical heating elements 62 (see FIG. 15) to 66. When the case 10 (see FIG. 1) is supported by the bottom wall 16 resting on a horizontal support surface, the contact button 75 engages a resiliently biased contact (not shown).

As shown in FIG. 15, a thermostat 76 is connected in series between the electrical heating elements 64 and 65. The thermostat 76 is set at a temperature of about 75° F. so that the electrical heating elements 62–66 approach this temperature prior to the thermostat 76 being effective to interrupt current flow to the electrical heating elements 62–66. The thermostat 76 is disposed in the recess 32 (see FIG. 1) about six inches above the bottom container 27 at the intersection of the end container 30 and the front container 28 (see FIG. 3) so that the thermostat 76 (see FIG. 15) is responsive to the temperature in the recess 32 (see FIG. 1).

The battery 67 (see FIG. 19) has its positive post connected by a wire 77 (see FIG. 1) to a contact button 78, which is exterior of the end wall 17 of the outer shell 11. The ground post of the battery 67 (see FIG. 19) is connected by a wire 79 (see FIG. 1) to a contact button 80, which is exterior of the end wall 17 of the outer shell 11. The ground terminal 71 (see FIG. 15) of the electrical heating elements 62–66 also is connected to the contact button 80 (see FIG. 1).

Each of the contact buttons 78 and 80 engages a separate resiliently biased contact button (not shown) at the same time that the contact button 75 engages the resiliently biased contact. Therefore, when the case 10 is transported to a location having an external power source, the battery 67 (see FIG. 19) can be recharged by current flow through the contact buttons 78 (see FIG. 1) and 80 and the electrical heating elements 62–66 (see FIG. 15) heated by current flow through the contact buttons 75 (see FIG. 1) and 80.

The battery 67 (see FIG. 19) provides the source of power for an object within the recess 32 (see FIG. 1) when the object is a recorder 81 (see FIG. 16) of a cableless seismic digital recording system of the type disclosed in the aforesaid Broding et al patent. The recorder 81 is supported on the flange 56 of the frame assembly 49. The recorder 81 has a flange 82, which rests on the upper surface of the flange 56 of the frame assembly 49. The flange 82 has a plurality of passages 83 therein and aligned with threaded holes 84 in the lower flange 56 of the frame assembly 49. A nut plate 85, which has a threaded hole, is supported by rivets 86 on the bottom surface of the lower flange 56 and in alignment with each of the threaded holes 84 in the lower flange 56. Thus, screws 87 extend through the passages 83 in the flange 82 of the recorder 81 and into the threaded holes 84 in the lower flange 56 of the frame asembly 49 and then into the nut plate 85. A gasket 88 (see FIG. 1), which is preferably formed of silicone, is mounted on the upper surface of the flange 56 of the frame assembly 49.

The recorder 81 (see FIG. 16) is suspended within the recess 32 (see FIG. 1) through being supported on the lower flange 56 of the frame assembly 49. This decreases the possibility of any damage occurring to the recorder 81 (see FIG. 16) if the case 10 (see FIG. 1) should be accidentally dropped.

Figure 6:
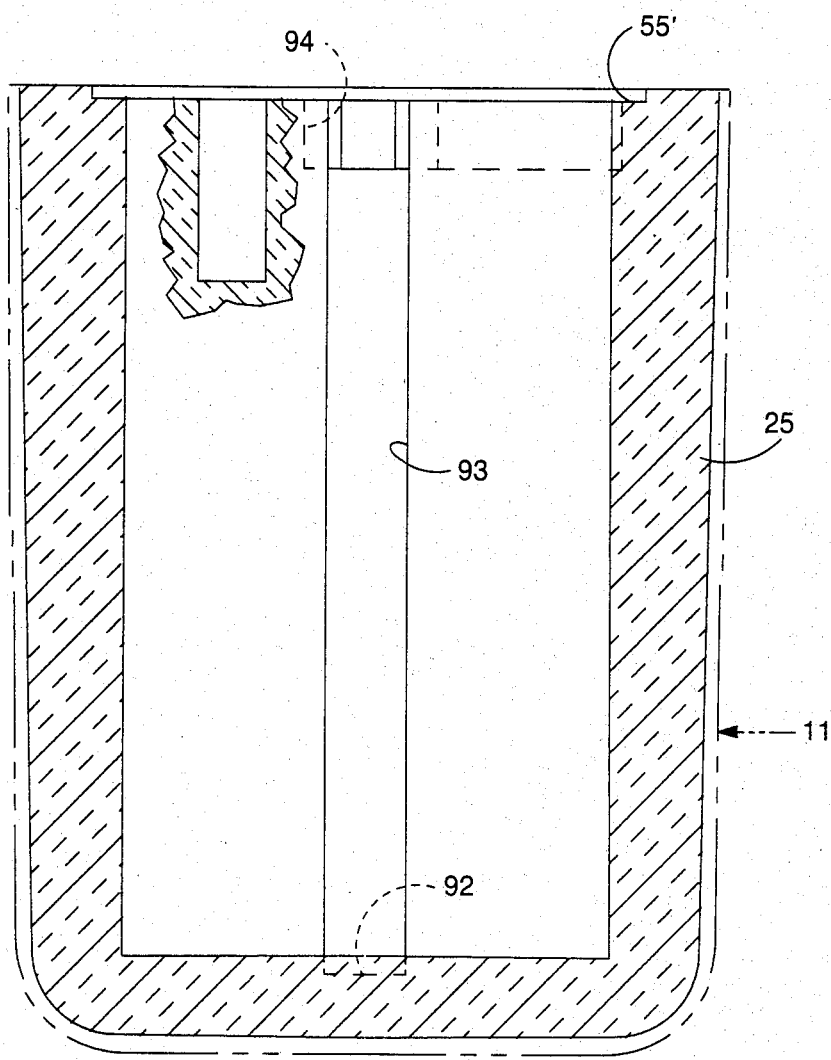
FIG. 6 is a sectional view of the thermally insulating or low thermal conductivity material of FIG. 5 with the outer shell of the case of FIG. 1 in phantom and taken along line 6—6 of FIG. 5.

The recorder 81 (see FIG. 16) is electrically connected to an electrical connector 90 (see FIG. 19), which has the battery 67 connected thereto. The connector 90 is connected to one end of a harness 91 of wires. The harness 91 extends through the slot 39 (see FIG. 12) in the end wall 40 of the bottom container 27 and into a horizontal slot 92 (see FIGS. 5 and 6) in a horizontal portion of the thermally insulating or low thermal conductivity material 25 beneath the bottom container 27 (see FIG. 1) and then into a vertical slot 93 (see FIGS. 5 and 6) in a vertical portion of the thermally insulating or low thermal conductivity material 25 behind the end container 31 (see FIG. 1). The upper end of the vertical slot 93 (see FIGS. 5 and 6) communicates with a circular recess 94 in the top of the thermally insulating or low thermal conductivity material 25. Most of the wires of the harness 91 (see FIG. 19) extend into the circular recess 94 (see FIG. 5) in the thermally insulating or low thermal conductivity material 25 for connection to a connector 95 (see FIG. 19), which is supported on the wider portion of the flange 55 (see FIG. 16) of the frame assembly 49 and extends through a circular opening 96 in the flange 55 of the frame assembly 49 and into the circular recess 94 (see FIG. 5) in the thermally insulating or low thermal conductivity material 25. Some of the wires of the harness 91 are connected to an input protect module 97 (see FIG. 19), which is supported within a rectangular shaped recess 98 (see FIG. 5) in the top of the thermally insulating or low thermal conductivity material 25 and communicating with the circular recess 94.

The connector 95 (see FIG. 19) is utilized only for testing the recorder 81 (see FIG. 16) through connection to a connector (not shown) connected to test equipment (not shown). This occurs only where the test equipment for the recorder 81 is located. This connection to the connector 95 requires the top shell 12 (see FIG. 1) to be opened.

The harness 91 (see FIG. 19) of wires has two wires extending to the input protect module 97 (see FIG. 19) from which two other wires extend through the thermally insulating or low thermal conductivity material 25 (see FIG. 2) for connection to two of four contacts 100 of a cable plug 101 disposed exterior of the outer shell 11. The four contacts 100 of the plug 101 are divided into two groups of two contacts with each group of two contacts being shorted to each other. This provides better electrical contact with geophone cables, which have seismic sensors connected thereto to sense seismic movements in the area in which the case 10 is disposed. The input protect module 97 (see FIG. 19) isolates the incoming signals from the geophone cables from the rest of the case 10 (see FIG. 2) to protect the incoming signals against any voltage spikes due to static electricity.

The plug 101 is supported in a cylindrical shaped housing 102, which is mounted in a circular opening 103 in the end wall 18 of the outer shell 11. The housing 102, which is formed of the same material as the outer shell 11 and is bonded to the end wall 18 of the outer shell 11, has a recess 104 within which the cable plug 101 is disposed so that the cable plug 101 does not protrude beyond the end wall 18 of the outer shell 11.

The housing 102 has an annular flange 105 (see FIG. 1), which bears against the inner surface of the end wall 18 for the bonding of the housing 102 to the outer shell 11. The housing 102 has an annular portion 106 extending beyond the flange 105 and of substantially the same thickness as the end wall 18 of the outer shell 11 so as to fit within the opening 103 (see FIG. 2).

A banana jack 107 is supported within the recess 104 in the housing 102. The banana jack 107 has two contacts 108 and 109 to which two of the wires of the harness 91 (see FIG. 19) of wires are connected. The contacts 108 (see FIG. 2) and 109 of the banana jack 107 are employed to transmit a signal for causing initiation of a seismic source, which is utilized to create the vibrations in the earth sensed by the seismic sensors connected to the geophone cables.

The recess 104 in the housing 102 has a door assembly 110 (see FIG. 8) disposed therein. The door assembly 110 is formed of a suitable material such as Lexan, for example, and is bonded on its outer circumference to an inner circular surface 111 (see FIG. 2) of the housing 102.

Figure 8:
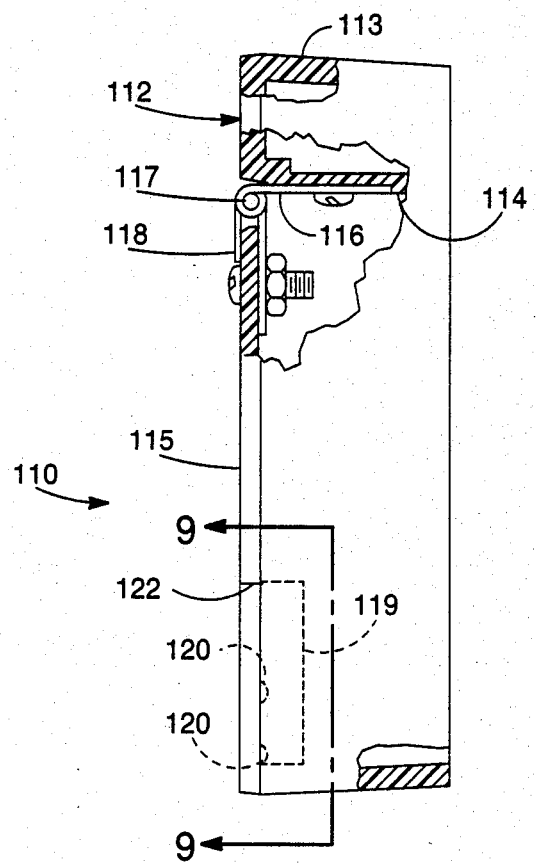
FIG. 8 is a side elevational view, partly in section, of a door used with the case of FIG. 1.

As shown in FIG. 8, the door assembly 110 includes a case 112 having an outer circular wall 113. The case 112 has a wall 114 extending between two portions of the outer circular wall 113. The wall 114 has a door 115 pivotally connected thereto by a hinge 116, which includes a hinge pin 117 about which the door 110 pivots. A spring 118 is wrapped around the hinge pin 117 intermediate its ends and has a portion engaging the door 115 to urge the door 115 to its closed position.

Figure 9:
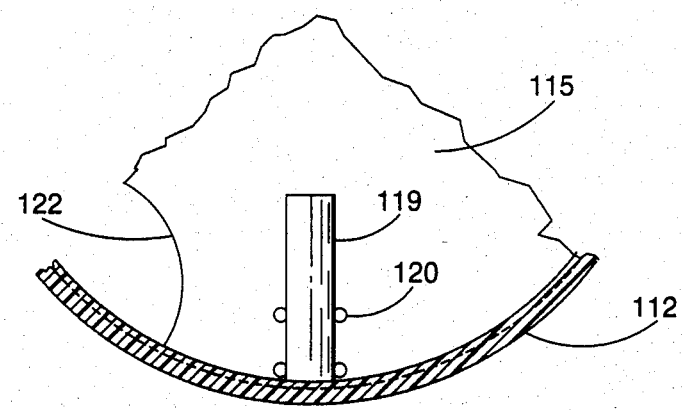
FIG. 9 is a fragmentary rear elevational view, partly in section, of a portion of the door of FIG. 8 and taken along line 9—9 of FIG. 8 to show the location of a magnet mounted in the door.

The door 115 has a magnet 119 (see FIG. 9) supported on its inner surface in a substantially vertical position between four protrusions 120 extending from the inner surface of the door 115. The magnet 119 is bonded to the door 115 by a suitable adhesive, for example.

The magnet 119 cooperates with a reed switch 121 (see FIG. 1), which is bonded to the exterior of the housing 102 by a suitable adhesive, for example. When the door 115 (see FIG. 8) is in its closed position, the magnet 119 (see FIG. 9) cooperates with the reed switch 121 (see FIG. 1) to open the reed switch 121 to prevent the recorder 81 (see FIG. 16) from being activated by a signal from an FM transmitter. With the door 115 (see FIG. 8) closed, mud, dirt, or snow is substantially prevented from entering the recess 104 (see FIG. 2) of the housing 102 although a relatively small amount of dirt, mud, or snow can enter through a relatively small cut-out portion 122 (see FIG. 9), which enables grasping of the door 115 to move it to its open position, in the door 115.

When the door 115 (see FIG. 8) is open so that the magnet 119 is no longer adjacent the reed switch 121 (see FIG. 1), the reed switch 121 closes. This connects an FM receiver in the recorder 81 (see FIG. 16) so that the recorder 81 can be activated from the FM transmitter since this is when the geophone cables, which have the seismic sensors connected thereto, are connected to the contacts 100 (see FIG. 2) of the cable plug 101.

A fuse 123 (see FIG. 19) is connected in the wiring between the positive post of the battery 67 and the connector 90. The fuse 123 extends through a circular opening 124 (see FIG. 16) in the wider portion of the flange 55 of the frame assembly 49. The fuse 123 (see FIG. 19) also extends into a circular recess 125 (see FIG. 5) in the recessed surface 55' in the top of the thermally insulating or low thermal conductivity material 25. Thus, the fuse 123 (see FIG. 19) is readily accessible when the top shell 12 (see FIG. 1) is in its open position.

The end wall 18 of the bottom shell 11 has an antenna mount 126 on its outer surface. A plate 127 is disposed on the inner surface of the end wall 18 and has the antenna mount 126 attached thereto by screws (not shown) extending through a plate 128, which is preferably formed of Delrin, of the antenna mount 126 and the end wall 18 and into the plate 127. A screw 129 extends through an electrically insulated washer 130 in the plate 127 and a passage 131 in the plate 128 of the antenna mount 126. The screw 129 also extends into a threaded passage 132 in a conductive insert 133, which is mounted in a threaded passage 134 in the plate 128.

A wire 135 is connected to the screw 129 and extends through the thermally insulating or low thermal conductivity material 25. The wire 135 is connected to the recorder 81 (see FIG. 16) to transmit the signal received from the FM transmitter by an antenna 136 (see FIG. 1), which is mounted in a threaded hole 137 in the insert 133, to the receiver in the recorder 81 (see FIG. 16).

The top shell 12 (see FIG. 3) has a handle 141 attached to its outer surface. The handle 141 has a rod 142 pivotally supported on a plate 143, which is attached by rivets 144 to a plate 145 on the inner surface of the top shell 12.

Considering the utilization of the case 10, the recorder 81 (see FIG. 16) is suspended within the recess 32 (see FIG. 1) by being mounted on the frame assembly 49 and the top shell 12 retained in its closed position by the latches 20. It is assumed that the phase change material in each of the hollow containers 27-31 and the container 58 is in its non-solid state with the phase change material in the containers 27-31 and 58 having been heated to a temperature beyond that at which the phase change material changes state. This would have been accomplished by the electrical heating elements 62-66 (see FIG. 15) heating the recess 32 (see FIG. 1).

When the case 10 is transported to the area in which it is desired to obtain field data, the door 115 (see FIG. 8) is opened and the geophone cables are attached to the contacts 100 (see FIG. 2) of the cable plug 101. It should be understood that a plurality of the cases 10 is employed in the area in which it is desired to obtain field data with only one of the cases 10 having the contacts 108 and 109 of the banana jack 107 connected to transmit a signal to initiate the seismic source. The recorder 81 (see FIG. 16) in each of the cases 10 (see FIG. 2) is simultaneously activated from the FM transmitter. This also causes the recorder 81 (see FIG. 16), which initiates the seismic source by transmitting a signal through the contacts 108 (see FIG. 2) and 109 of the banana jack 107, to produce a signal to the contacts 108 and 109 of the banana jack 107 upon receiving the signal from the FM transmitter shortly prior to the activation of the recorder 81 (see FIG. 16) in each of the cases 10 (see FIG. 2). The data from the vibrations in the earth produced by the initiation of the seismic source is recorded on a removable tape in the recorder 81 (see FIG. 16) in each of the cases 10 (see FIG. 2).

At the completion of a work day, the geophone cables are disconnected from the contacts 100 of the cable plug 101 of each of the cases 10 and the door 115 (see FIG. 8) of each of the cases 10 (see FIG. 2) is closed. The cases 10 are then returned to an area having an external power source to recharge the battery 67 (see FIG. 19) and to energize the heating elements 62-66 (see FIG. 15).

Figure 20:
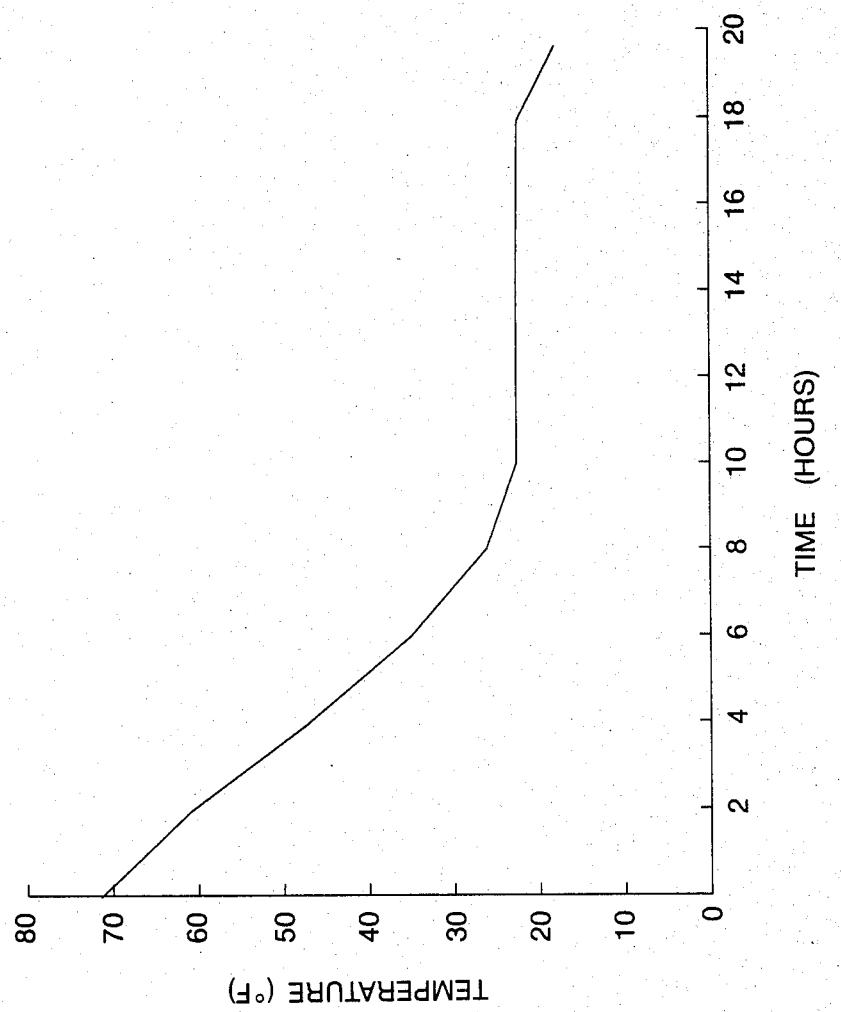
FIG. 20 is a graph showing the temperature of the interior of the case at various time periods during a test.

A low temperature case similar to the case 10 was tested in an environmental test chamber where the ambient temperature in the environmental test chamber was maintained at −40° F. When the recorder, which was similar to the recorder 81 (see FIG. 16), was preheated to 70° F., the temperature of the recorder within the case was maintained at a minimum of 22° F. for at least ten hours. The temperature profile of the recorder with an ambient temperature equal to −40° F. is shown in FIG. 20. This discloses the temperature of the recorder remaining above 22° F. for eighteen hours.

At its junction with the end wall 18 (see FIGS. 1 and 2) of the outer shell 11, the bottom wall 16 has a recess 146. The recess 146 enables the bottom portion of the case 10 to be grasped by the user and pulled along a horizontal surface on which the bottom wall 16 of the outer shell 11 of the case 10 is supported.

It should be understood that the case 10 may be utilized with any type of object to be protected from an ambient having a higher or lower temperature than that at which it is desired to maintain the object. Thus, the case 10 could be employed to protect an object in which it is desired to prevent the object from heating beyond a selected temperature in a high temperature ambient.

Furthermore, the recorder 81 (see FIG. 16) could be of a different size and weight, for example. One type of recorder is larger than the recorder 81 and requires more power. As a result, this would necessitate a change in the structure of the top shell 12 (see FIG. 1) of the case 10 to accommodate the increased size. The additional weight also would require the bottom container 27 to be fixed in place so that it could not shift during an accidental fall and damage any of the containers 28-31.

Additionally, the material of the containers 28-31 and the top container 58, which would have its configuration changed to accommodate the increased size of the larger recorder, would have to be strengthened because of the heavier weight of the recorder to prevent damage. One suitable example of the stronger material would be polycarbonate.

While the containers 27-31 have been shown and described as being separate, it should be understood that they could be formed as a single container if desired. It is only important that the containers 27-31 substantially surround the recess 32.

While the top container 58 in the top shell 12 has been shown and described as not having any heating means connected thereto, it should be understood that heating means could be utilized, if desired, with the top container 58. However, such has not been necessary to obtain the desired results of the present invention.

The containers 27-31 may be retained in position by any suitable means other than the frame assembly 49. For example, each of the containers 28-31 could be attached to the thermally insulating or low thermal conductivity material 25 adjacent thereto by suitable adhesive, for example. This retaining arrangement could be employed where it was not necessary to support a relatively heavy object in suspended relation within the recess 32 as it is necessary to support the recorder 81 (see FIG. 16).

While the access opening to the recess 32 (see FIG. 1) has been shown at the top thereof and the access opening to the outer shell 11 has been shown at the top of the outer shell 11, it should be understood that each of these access openings could be located other than at the top. It is only necessary that the recess 32 have an access opening and that the access opening in the outer shell 11 be in communication with the access opening to the recess 32 so that an object or objects may be placed within the recess 32.

While the outer shell 11 and the containers 27-31 have been shown and described as being separate from each other, it should be understood that the containers 27-31 and the outer shell 11 could be formed integral since they may be of the same material. In such an arrangement, it is preferable to have the thermally insulating or low thermal conductive material 25 disposed therebetween.

An advantage of this invention is that it is capable of maintaining an object above a selected temperature for a selected period of time when the ambient in which the case is disposed is below a selected temperature or below a selected temperature for a selected period of time when the ambient in which the case is disposed is above a selected temperature. Another advantage of this invention is that it enables the use of electronic equipment in relatively cold ambient temperatures for a normal working day without damage to the equipment due to the relatively cold ambient temperatures.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A thermally insulated case including:
   an outer shell having a low thermal conductivity material on its inner surface;
   said outer shell having first container means disposed adjacent said low thermal conductivity material on the inner surface thereof;
   said first container means defining an interior recess bounded by said first container means excepting a first access opening to said recess;
   said first container means having a leak-resistant phase change material therein for heat exchange with any object within said recess;
   said leak-resistant phase change material comprising a mixture of water, gelatin, sodium benzoate and a biocide;
   said outer shell having a second access opening communicating with said first access opening;
   and closing means to close said second access opening.

2. The case according to claim 1 in which:
   said closing means has a low thermal conductivity material on its inner surface; and
   said closing means has second container means in contact with said low thermal conductivity material on the inner surface of said closing means and in communication with said recess, said second container means having a leak-resistant phase change material therein for heat exchange with any object within said recess.

3. The case according to claim 1 in which:
   said outer shell comprises a bottom wall and a plurality of walls extending upwardly from said bottom wall and integral therewith and with each other;
   said second access opening is at the top of said upwardly extending walls of said outer shell; and
   said first container means includes:
   a bottom container supported on said low thermal conductivity material on the inner surface of said bottom wall and in contact with said low thermal conductivity material;
   a separate upwardly extending container in contact with said low thermal conductivity material on the inner surface of each of said upwardly extending walls and having a surface engaging said bottom container so that said containers surround said recess except for said access opening formed between the upper ends of said upwardly extending container; and
   maintaining means to maintain the surface of each of said upwardly extending containers against said bottom container.

4. The case according to claim 3 in which said maintaining means includes means engaging the inner surface of each of said upwardly extending containers adjacent its upper end to urge the upper end of each of said upwardly extending containers into engagement with said low thermal conductivity material on the adjacent of said upwardly extending walls and the bottom end of each of said upwardly extending containers into engagement with said bottom container.

5. The case according to claim 4 in which said second container means is disposed in said closing means to substantially close said first access opening between the upper ends of said upwardly extending containers when said closing means closes said second access opening.

6. The case according to claim 1 in which said biocide comprises o-phenylphenol and o-benzyl-p-chlorophenol.

7. The case according to claim 1 in which said leak-resistant phase change material is formed by mixing a ratio of 100 ml of water with 14 gm of gelatin and 0.1 gm of sodium benzoate, with 100 ml of this mixture of water, gelatin and sodium benzoate having 2 ml of a biocide added thereto.

8. Apparatus for shielding electronic seismic exploration circuitry from ambient temperatures outside the operating temperature specifications of the circuitry, the improvement comprising:
   a shell of material having a low thermal conductivity between its exterior surface exposed to the ambient temperatures and its interior surface, the interior surface of said shell defining a region for containing the circuitry, said region having an access thereto;
   said shell having a leak-resistant phase change material for maintaining the temperature of said region within the operating temperature of the circuitry,
   said leak-resistant phase change material comprising a mixture of water, gelatin, sodium benzoate and a biocide,
   said leak-resistant phase change material being disposed in surrounding relation to at least said region other than said access to said region;
   and a closure for sealing said access to said region.

9. The apparatus according to claim 8 including means disposed in said region between the interior surface of such shell and the circuitry, said disposed means having said leak-resistant phase change material therein.

10. The apparatus according to claim 9 wherein:
    said closure is of material having a low thermal conductivity between its exterior surface exposed to the ambient temperatures and its interior surface which contacts said region when said access is sealed; and,
    additional phase change material means disposed in said region between the interior surface of said closure and said circuitry, said additional phase change material means having a leak-resistant phase change material therein for maintaining the temperature of said region within the operating temperature of said circuitry.

11. The apparatus according to claim 9 including means in heat exchange relationship with said phase change material means selectively operative for changing the temperature of said leak-resistant phase change material.

12. The apparatus according to claim 8 wherein said closure is of material having a low thermal conductivity between its exterior surface exposed to the ambient temperatures and its interior surface which contacts said region when said access is sealed, said closure having additional leak-resistant phase change material for maintaining the temperature of said region within the operating temperature of said circuitry.

13. The apparatus according to claim 8 including means in heat exchange relationship with said leak-resistant phase change material selectively operative for changing the temperature of said leak-resistant phase change material.

14. The apparatus according to claim 8 in which said biocide comprises o-phenylphenol and o-benzyl-p-chlorophenol.

15. The apparatus according to claim 8 in which said leak-resistant phase change material is formed by mixing a ratio of 100 ml of water with 14 gm of gelatin and 0.1 gm of sodium benzoate, with 100 ml of this mixture of water, gelatin, and sodium benzoate having 2 ml of a biocide added thereto.

* * * * *